United States Patent [19]
Goldberger

[11] Patent Number: 4,543,240
[45] Date of Patent: Sep. 24, 1985

[54] METHOD FOR THE CONTINUOUS PRODUCTION OF CARBIDES

[75] Inventor: William M. Goldberger, Columbus, Ohio

[73] Assignee: Superior Graphite Co., Chicago, Ill.

[21] Appl. No.: 691,076

[22] Filed: Jan. 14, 1985

Related U.S. Application Data

[62] Division of Ser. No. 119,680, Feb. 8, 1980, abandoned.

[51] Int. Cl.⁴ .............................................. C01B 31/36
[52] U.S. Cl. ................................... 423/346; 423/345; 501/88; 501/90
[58] Field of Search ..................... 423/345, 346; 34/1, 34/10; 501/88, 90

[56] References Cited

U.S. PATENT DOCUMENTS

| | | | |
|---|---|---|---|
| 1,979,052 | 10/1934 | Ridgway | 423/345 |
| 2,677,627 | 5/1954 | Montgomery et al. | 423/346 X |
| 2,840,458 | 10/1958 | Hamister | 423/345 |
| 3,368,871 | 2/1968 | O'Connor et al. | 423/345 |
| 3,448,234 | 6/1969 | Goldberger et al. | 423/DIG. 16 |
| 3,754,076 | 8/1973 | Cutler | 423/345 |
| 4,057,396 | 11/1977 | Matovich | 423/345 X |
| 4,100,233 | 7/1978 | Yajima et al. | 423/345 |
| 4,118,464 | 10/1978 | Cutler | 423/346 |

FOREIGN PATENT DOCUMENTS

| | | | |
|---|---|---|---|
| 216974 | 7/1957 | Australia | 13/23 |
| 1196169 | 7/1965 | Fed. Rep. of Germany | 423/345 |
| 52-28758 | 7/1977 | Japan | 423/345 |
| 55-80713 | 6/1980 | Japan | 423/346 |
| 1236913 | 6/1971 | United Kingdom | 423/346 |
| 440542 | 1/1975 | U.S.S.R. | 34/10 |

*Primary Examiner*—Jack Cooper
*Attorney, Agent, or Firm*—Robert M. Ward

[57] ABSTRACT

One aspect of the present invention relates to methods for the continuous production of silicon carbide and other carbide and refractory products by fluidized bed techniques, the apparatus for such continuous production, and the carbide products produced therefrom being further aspects of the present invention.

2 Claims, 2 Drawing Figures

METHOD FOR THE CONTINUOUS PRODUCTION OF CARBIDES

This is a division of application Ser. No. 119,680, filed Feb. 8, 1980 now abandoned.

BACKGROUND OF THE INVENTION

The present invention relates in general to the production of silicon carbide and more particularly to the continuous production of silicon carbide and other carbide and refractory products utilizing fluidized bed techniques, the apparatus suitable for carrying out such methods, and the novel product resulting therefrom.

In prior art techniques for the commercial production of silicon carbide, large batch-operated furnaces, known as Acheson furnaces, have been provided. In the operation thereof, a high quality silica sand is first mixed with a carbonaceous material, such as petroleum coke, pitch or anthracite to form a charge which is built up around a central core of granular, conductive carbon material, such as calcined petroleum coke or granular graphite. The core is oriented horizontally, and carbon or graphite electrodes are disposed through the end walls of the furnace to make electrical contact with the prepared core. The walls of the furnace comprised loose firebrick, and are usually supported by iron castings which can be removed at the end of the process to facilitate extrication of the treated charge. The temperature in the core generally reaches about 2200° C., and the flow of heat from the core to the surrounding charge causes the carbide formation reaction to take place. Namely:

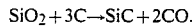

$$SiO_2 + 3C \rightarrow SiC + 2CO.$$

Although useful for some purposes, certain deficiencies and defects are present in the Acheson process. In many cases, the core temperature becomes too high, and the silicon carbide decomposes to silicon metal and a graphitic form of carbon. Moreover, the energy efficiency of the Acheson process is relatively low—usually less than about 60 percent. Also, periods of 50 to 60 hours or longer are required to complete the charging, heating, and cooling cycle. Yet additionally, the Acheson process is not conducive to containing the influent gases comprising carbon monoxide from the production of silicon carbide.

Wherefore, in view of the deficiencies and defects of prior art techniques, improvement is required and the same is accomplished as is set forth hereinbelow in connection with the description of the novel methods, apparatus and products of the present invention.

SUMMARY OF THE INVENTION

The present invention is directed to methods and apparatus for the manufacture of silicon carbide and other carbide and refractory products and the novel products resulting therefrom utilizing fluidized bed techniques. In particular, a carbon material and a silicon material are introduced continuously into a closed vessel. A non-reactive gas is distributed beneath the particulate matter to fluidize the same. An electrical potential is applied between the vessel and a centrally disposed electrode to heat the contents of the fluidized bed to a temperature and for a period sufficient to convert the silica and carbon to silicon carbide. These silicon carbide bearing solids are continuously removed from the fluidized reaction vessel. Inasmuch as the product obtained by the practice of this process may be produced directly in a finely divided state, and without grinding, this product is novel and such product is an aspect of the present invention. Also, a novel aspect of the product produced by the process of the present invention is the presence of silicon carbide crystals within the interstices of the unreacted carbon influent, which product is also novel and a further aspect of the present invention.

The preferred embodiments of the method, apparatus and product of the present invention may be better understood with reference to the following drawing and detailed description of preferred embodiments.

BRIEF DESCRIPTION OF THE DRAWING

Preferred embodiments of the method and apparatus as summarized above and as set forth in greater detail hereinbelow are illustrated in the following drawings, in which.

DETAILED DESCRIPTION OF PREFERRED EMBODIMENTS

Figure 1:
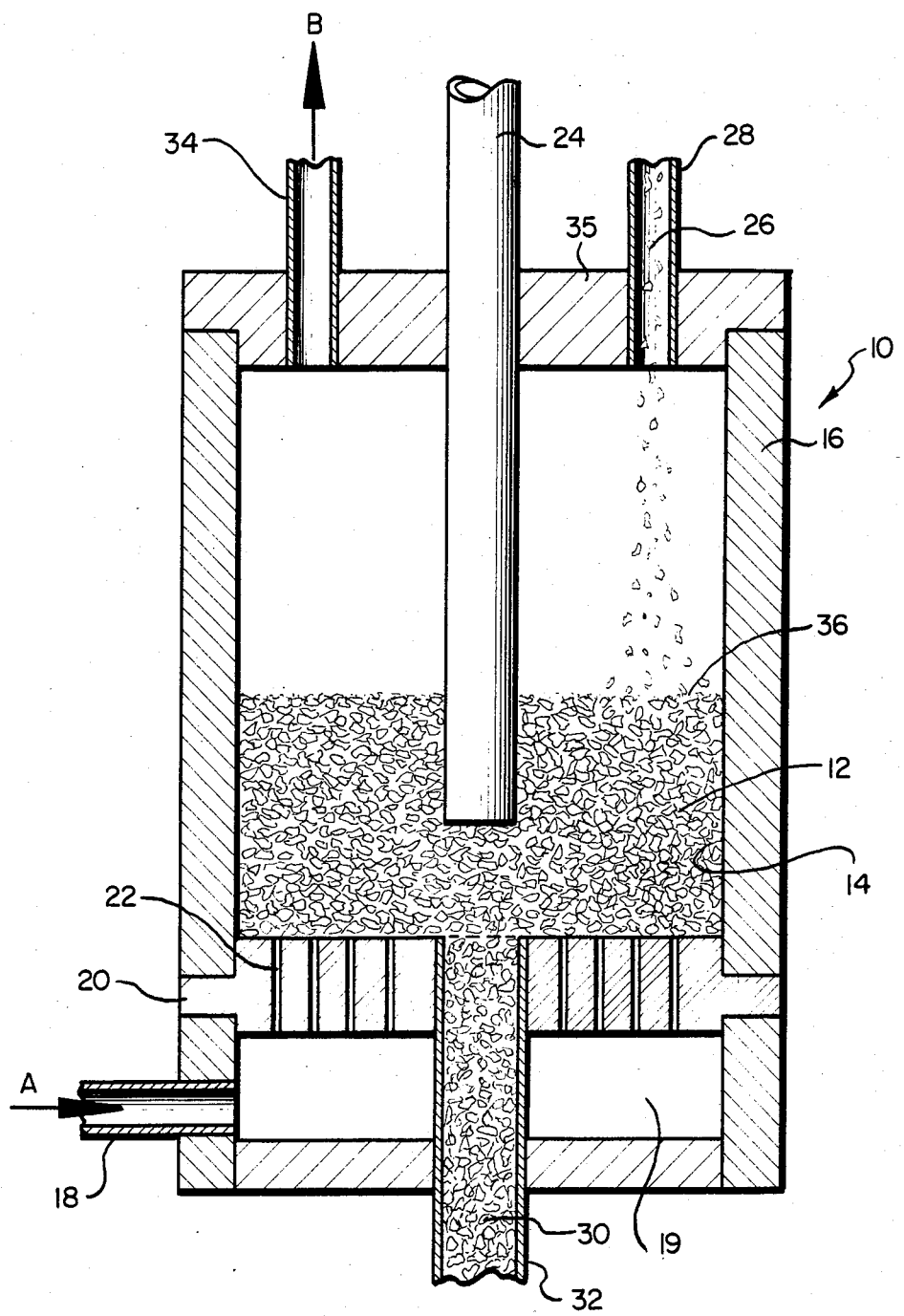
FIG. 1 is a fragmented longitudinal cross-sectional view of a fluidized bed furnace apparatus for carrying out the method of the present invention and for producing the novel products obtained thereby.

The present invention comprises novel methods, novel apparatus, and novel products produced from such methods. One aspect of the present invention is the method for continuously producing silicon carbide comprising continuously introducing a siliceous and a carbonaceous material into a fluidized bed of electrically conductive particulate matter, maintaining the bed in a fluidized condition by controlling the flow rate of gases entering beneath the fluidized bed, applying an electrical potential between electrodes disposed in direct contact with the particles of the fluidized bed to cause a sufficient flow of electrical current through the fluidized bed to heat the bed to a temperature level sufficient for reaction of silica with the carbon to form silicon carbide, and continuously removing the silicon carbide bearing solids from the fluidized bed. In such method, the siliceous and carbonaceous materials may be introduced individually as free flowing granular solids, or may be premixed and introduced either as free flowing granular solids or as agglomerated pellets. The fluidizing gas may be any non-reactive gas, such as for example nitrogen or carbon monoxide, and in certain preferred alternative embodiments the fluidizing gas may be obtained by recirculating a portion of the gases generated by the chemical reaction within the furnace.

The silica and the carbon may, in some embodiments, be introduced as a fine powder comprising particles of less than approximately 10 microns in diameter, whereupon the product produced by such a method is a silicon carbide of extremely small particle size. Inasmuch as such product is made without grinding, such a product has novel properties and forms a part of the present invention.

The siliceous compound introduced may be a liquid, such as for example silicon tetrachloride or trichlorosilane. Alternatively, the silicon tetrachloride or trichlorosilane or other siliceous compound may be introduced in gaseous form. Likewise, the carbon bearing material may be introduced in the form of a hydrocarbon liquid or hydrocarbon vapor. Also in preferred embodiments, green (uncalcined) petroleum coke, and/or other carbonaceous materials as coal, coke, wood chars, etc. may be utilized.

In alternative preferred embodiments, the silicon carbide reaction product may be removed from the apparatus of the present invention in several distinct manners. In some preferred embodiments, the silicon carbide reaction product is removed from a discharge opening located in the bottom of the fluidized bed. In an alternative embodiment, the silicon carbide reaction product is removed through a discharge opening located at an elevation disposed above the bottom of the fluidized bed. Yet further, the silicon carbide may be removed by eleutriation from the upper portion of the fluidized bed and carried out of the furnace by entrainment within the gaseous effluent leaving the fluidized bed furnace, where such silicon carbide is of sufficiently small particulate diameter to do so.

In a further alternative preferred method of the present invention, a coarse particulate carbon matter is introduced into a heat resistant container and a sufficient flow of non-reactive gas for the fluidization thereof is introduced through the bottom of the container to form a fluidized bed. An electrical potential is applied between electrodes disposed in direct contact with the fluidized carbon particles, and preferably centrally disposed within the fluidized bed, to cause electrical current to flow through the bed material between the electrodes in direct contact with the fluidized bed and at a rate sufficient to heat the fluidized bed to a temperature in excess of the temperature of decomposition of silicon carbide.

A relatively finer size of particulate carbon material is then introduced into the fluidized bed of relatively coarser particulate carbon. The relative size difference of the coarser and finer particulate carbon, and the velocity of the fluidizing gas, are controlled to cause the finer particulate matter to be maintained in a state of dense phase fluidization in an elevated region above the fluidized bed of the coarser particulate carbon. Sufficient heat is removed from the elevated zone of the finer particulate carbon to cause the temperature of the elevated fluidized bed of the finer particulate carbon to be lower than the temperature of the fluidized bed of the coarser particulate carbon, and below the decomposition temperature of silicon carbide, but above that temperature required to form silicon carbide by the reaction of vapor forms of silicon and solid carbon.

Next, a compound of silicon is introduced into the fluidized bed of coarser particulate carbon to cause silicon vapors to form and to pass upwardly through the lower temperature fluidized bed of finer particulate carbon and to react with the finer carbon to form silicon carbide. Finally, the generated silicon carbide is removed from the fluidizing bed furnace. In any of the above preferred alternative methods of the present invention, the silicon carbide formed may be beneficated by separation of carbon from the silicon carbide.

In such alternative preferred embodiments, the fluidization vessel made of heat resistant and electrically conductive material preferably has a lower zone, and an upper zone of larger cross-sectional area, connected by transition zone. Means are provided for the introduction of coarse and fine carbonaceous solids into the fluidization vessel. Disposed at the bottom of the vessel are gaseous distributors for fluidizing the particular matter contained in the vessel. In such apparatus, an electrode preferably is disposed to enter from the top and to extend vertically downward into the lower zone of the smaller cross-sectional area. A discharge port for continuously removing silicon carbide bearing reaction products from the upper larger cross-sectional area zone and means for so doing in a controlled rate are provided. Means for the introduction of silicon bearing agents into the lower fluidized bed zone and means for removing gases from the free board area of the fluidized bed are provided. Such apparatus of the present invention also include means for applying a sufficient electrical voltage between the electrodes to cause current to flow through the fluidized bed in the lower section.

Referring now to the drawing, and to FIG. 1 in particular, the methods of the present invention are carried out preferably with respect to a specialized electrical furnace, generally 10, for production of silicon carbide and other solid carbides and refractory materials. The specialized electrical furnace 10 may be termed an electrothermal fluidized bed (EFB) furnace. Such EFB furnace 10 has the ability to operate continuously and allow substantially increased energy efficiency over prior art processes, as it eliminates energy losses associated with cyclic heating and cooling of the furnace. EFB furnace 10 employs an electrically conductive solid material 12 in particulate form. This material is contained within a charge zone 14 by the furnace walls 16. A gas (indicated at Arrow A) entering the furnace through pipe 18 and through gas chamber 19, is made to flow upwardly through a horizontal plate gas distributor 20 and enters the mass of particulate solid material 12 through a multiplicity of gas orifices 22 in distributor plate 20. The flow rate of the gas is selected to flow at a sufficiently high rate to cause the mass of solid particles 12 to become fluidized and to behave in the characteristic manner common to the state of fluidization and fluidized bed systems.

A preferably centrally disposed vertical electrode 24 is immersed into the fluidized bed of particles 12 and serves as one electrode of the bed. The furnace walls 16 may preferably be constructed of a heat resistant and electrically conductive material, such as graphite, which serves as the other electrode in direct contact with the bed of fluidized particles 12. By applying a voltage between the electrodes 16 and 24, an electrical current is made to flow through the bed of particles.

The flow of current causes the bed to be heated in accord with the $I^2R$ conversion of electrical energy into heat. Extremely high temperatures can be achieved with the EFB furnace apparatus. Temperature limits are imposed only by the melting point and physical properties of the solid bed material, the electrode material and the materials of construction of the furnace. Graphite is an exceptionally well suited material for this purpose, and continuous steady state operating temperatures approaching 3500° C. are attainable for the EFB furnace.

The use of fluidized bed furnace apparatus 10 provides a number of very significant advantages for high temperature furnaces. The fluidized bed is an excellent conductor of heat, and therefore the temperature throughout the bed is essentially uniform. This feature enables effective control of the temperature of the furnace. Because of the mobility of the particles within furnace 10, and because of their fluid-like behavior, solid influent materials 26 can be continuously fed by gravity through feed inlet 28 to the high temperature reaction zone 14 of the furnace. Similarly, effluent solids 30 may be continuously withdrawn by gravity flow through discharge port 32 without need for mechanical devices or moving parts within furnace 10. Thus, furnace 10 can be operated continuously and at steady state. Moreover, the vigorous movement of the individual particles in the fluidized state, and the excellent and uniform contact of the particles with the gases rising through the bed, enables a rapid approach to chemical equilibrium and uniform conversion of the individual particles. Thus, rapid rates of production and product uniformity and quality can be simultaneously achieved. In addition, the gaseous effluent (Arrow B) can be withdrawn through exhaust pipe 34 in top 35 of furnace 10, and can be readily cleaned and treated to control particulate and gaseous pollutants to the extent required.

In the case of producing silicon carbide by EFB furnace 10, there are a number of available options for feeding the silicon-bearing and the carbon-bearing materials. These solids may be fed individually as dry powders through separate feed devices, and through feed inlets located to allow solids to be fed either below or from above the level of the fluidized bed. Alternatively, the silica and carbon may be intimately mixed and fed through a single feed device, such as inlet 28. There may also be advantage in agglomerating the reactants into pellets or briquettes in approximate stoichiometric ratio for complete chemical reaction. Liquid or vaporized forms of the reactants can also be used. Organic and naturally occurring sources containing both carbon and silica, such as for example rice hulls or natural graphite, may be utilized.

The choice of the method of the present invention to be utilized for a given application will depend mainly upon the characteristics desired in the product. For example, to obtain a relatively coarse material, such as metallurgical grades of silicon carbide, a pelletized or briquetted stoichiometric mixture of the reactants may be preferable. However, if it is desired to produce a silicon carbide fume product comprising micron or sub-micron sized particles of silicon carbide, the silicon may be introduced as ultra-fine silica powder having a mean particle diameter of less than about 10 microns, or as a silicon bearing gas such as trichlorosilane and reacted with a carbon-bearing material having a mean particle diameter of less than about 10 microns, or with a carbon-bearing gas such as methane, propane or other. Fibrous forms of silicon carbide can be made from certain natural organic materials such as rice hulls, which have fibers containing both silica and carbon. It is evident therefore that EFB furnace 10 is an extremely versatile furnace suitable for producing a variety of silicon carbide products and other carbide and refractory materials of distinctly different physical size and physico-chemical character.

The preferred embodiments of methods utilized in connection with EFB furnace 10 for silicon carbide manufacture will depend on the nature of the product of interest. For example, in making relatively coarse-grained and dense silicon carbide, it is preferable to pelletize a finely ground intimate mixture of silica sand and coke. Various binders may be used to assure the structural integrity of the pellets of feed mixture when introduced into EFB furnace 10. In this product application, the pellets are introduced from the top at inlet 28 and allowed to fall by gravity onto the upper surface 26 of fluidized particle bed 12 and become intermixed with the bed as in the configuration illustrated in FIG. 1. The material in fluidized bed 12 thus becomes, at least in part, a mixture of feed pellets that range from a material that is partially to fully converted to silicon carbide. This pellet product can be continuously withdrawn from the bottom of fluidized bed 12 through discharge port 32 to a cooling chamber and cooler conveying mechanism (not shown). In alternative embodiments, discharge port 32 may be disposed horizontally through furnace wall 16, rather than vertically through distributor plate 20, as shown in FIG. 1.

In this preceding method of the present invention, it can prove advantageous to add graphite or other particulate solid carbon material to fluidized bed 12 to reduce the overall electrical resistance of the furnace as measured between the electrodes. When this is done, the silicon carbide product can be readily separated and recovered from the silicon carbide/carbon mixture by various conventional physical separation methods based on size, shape, density and other physical/chemical differences.

Figure 2:
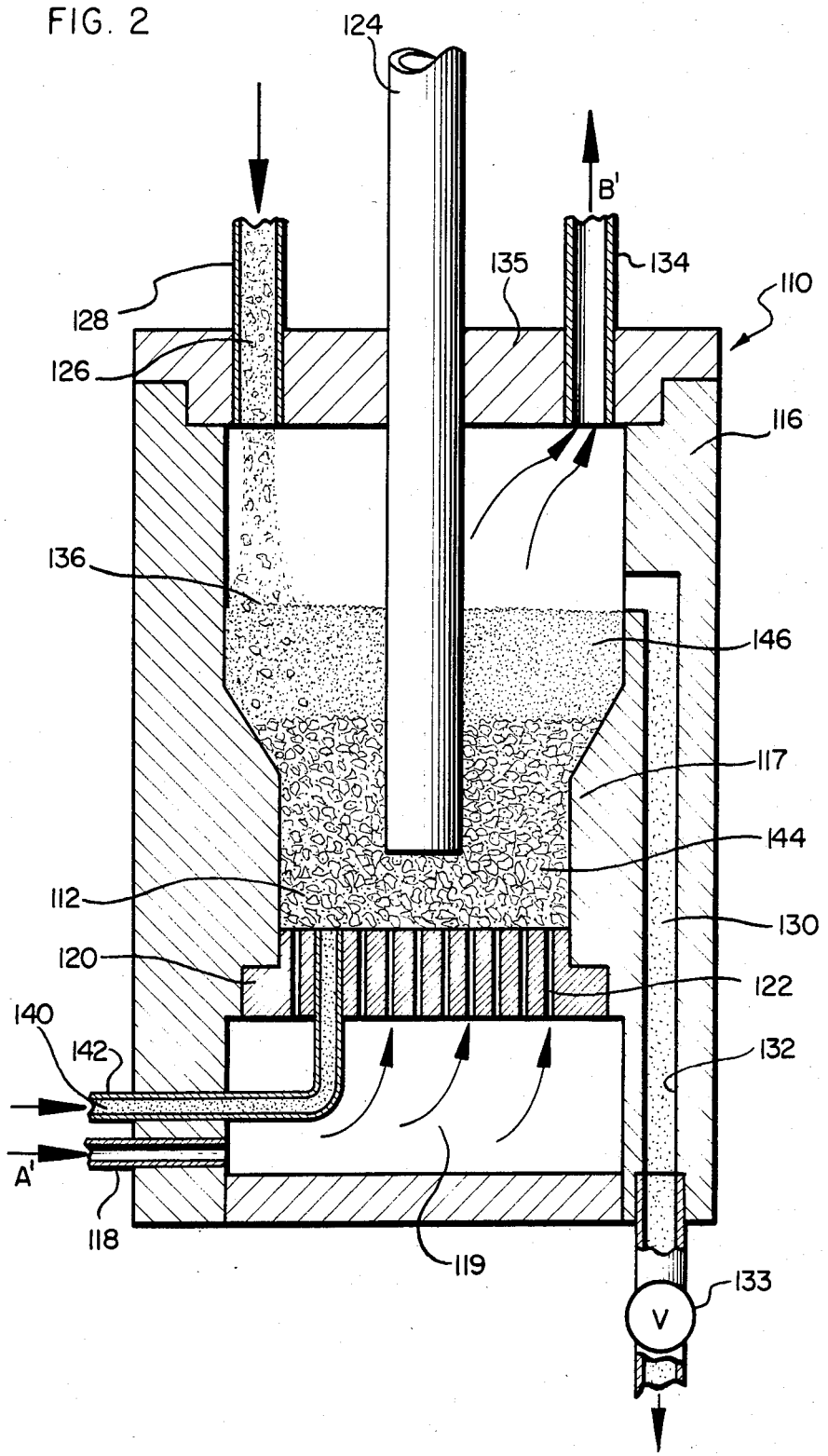
FIG. 2 is a longitudinal cross-sectional view of an alternative preferred embodiment of an apparatus for carrying out the method and for producing the novel products of the present invention.

A unique silicon carbide product is made in embodiments of the present invention which incorporate feeding finely divided silica into fluidized bed 12 of particulate carbon. Petroleum coke is well suited as the carbon material, although other carbon forms such as various chars can also be used. The furnace, generally 110 of FIG. 2, is suitable for these methods. The particulate carbon material 126 is fed by gravity through inlet 128 in the top of furnace 110. Finely divided silica 140 is fed through a suitably cooled feed nozzle 142 to enter the fluidized bed 112 of relatively coarse carbon at a point below the upper surface 136 of bed 112.

The fluidizing gas (Arrow $A^1$) enters pipe 118 and enters gas chamber 119 and is distributed to bed 112 to fluidize the same through orifices 122 in gas distributor 120, exiting (Arrow $B^1$) from furnace 110 through exhaust pipe 134 in top 135 of the furnace. As in other embodiments described, supra, the respective electrodes are a centrally disposed electrode 124 and furnace wall 116. However, in preferred alternative embodiments, the furnace wall electrode 117 may be of a smaller diameter in the lower zone 144 than in the upper zone 146. Withdrawal of the novel carbide/carbon reaction product 130 may be made in preferred embodiments through a discharge chamber 132 disposed within furnace wall 116.

The reaction which takes place between silica and carbon in such embodiments tends to form a silicon carbide coating on the surface of the carbon and to some extent throughout the inner surfaces of the pores of the carbon. The extent of the coating can be controlled by controlling the relative feed rates of silica and carbon, the type of carbon used, and the other process parameters, such as temperature and retention time. The silicon carbide/carbon product then is an intimate mixture of silicon carbide and carbon which can be used directly, for example as a silicon/carbon additive to molten iron. The mixture also offers other unique properties as an insulating refractory material, and as a granular conductive material for resistive heating in oxidizing atmospheres. This special reaction product 130 can also be processed by various physical and chemical methods to separate the silicon carbide from the unreacted carbon to yield silicon carbide powder and fine flake-like silicon carbide with improved properties for special abrasive and ceramic applications.

In the case of producing a novel form of ultra-fine particulate silicon carbide, it is advantageous to first generate a gaseous form of silicon which may be injected into bed 112 through feed nozzle 142. Vaporized silicon metal, silicon monoxide vapor, silicon tetrachloride and trichlorosilane are examples of silicon bearing gases suitable for this reaction. In these embodiments of the present invention, it is also advantageous to maintain the lower part 144 and fluidized bed 112 at a temperature sufficiently above the silicon carbide decomposition temperature, such that silicon in vapor form rises upward through this high temperature zone 144. After rising through higher temperature zone 144, the temperature decreases due to loss of heat and silicon vapors and the silicon gases can react with carbon to form stable silicon carbide. A particularly advantageous embodiment of this concept involves use of green petroleum coke as the carbon source. The volatile carbonaceous components, which vaporize in the upper fluidized zone 146, react rapidly with silicon vapors to form a silicon carbide product in submicron size. This fume product is entrained in the gases (Arrow B$^1$) leaving furnace 110 through exhaust pipe 134 and is collected by cooling and filtering the gases in the unoxidized state.

With the configuration as illustrated in FIG. 2, it is also possible to feed fine particulate carbon, such as very finely ground coke, char, or natural graphite fines and cause these fines to react with vapor forms of silicon in the upper fluidized zone 146 of furnace 110 to form a fine particulate solid silicon carbide that is removed in part by elutriation as in the fume product case or as a solid material which is removed by gravity flow through discharge chamber 132, which includes preferably a shut-off valve 133.

The embodiment shown in FIG. 2 is particularly advantageous in that the electrical resistance of the lower zone 144 of coarser carbon material is substantially lower than that for the upper fluidized bed 146 of the finer carbon and silicon carbide material. In addition, the length of the electrical path from central electrode 124 to the wall electrode 117 being substantially less in lower zone 144 results in a much higher flow of electrical current from electrode 124 to walls 117 in lower zone 144. These factors cause lower zone 144 to become substantially hotter to enable the desired difference in temperature between upper and lower zones 146, 144 to be maintained. Additionally, the centrally disposed electrode 124 may be formed with a longitudinal passage therein for the introduction of supplemental coarse or other carbonaceous material therethrough as may be desirable in preferred alternative embodiments.

It should be emphasized that the characteristics of the silicon carbide materials made as described above are substantially distinct from prior art products, due to differences in starting materials, and specifically due to substantial differences in the temperature history and elements of the furnace of the present invention. The extremely rapid heating and formation through vaporization produces silicon carbide of substantially higher specific surface area and which contains micro-cracks and microporosity substantially different from silicon carbide materials made in the prior art Acheson furnace.

It is also emphasized that the versatility of the EFB furnace of the present invention which allows use of various forms of silicon-bearing and carbon-bearing reactants, including granular materials, fine powders and gases and vapors, provides opportunities to make a variety of products from granular material to fine powders and ultra-fine fume-like products.

Upon review of the present disclosure of the novel and improved methods, apparatus and products of the present invention, modifications and variations will be suggested to those skilled in the art and the same are intended to be covered by the scope of the appended claims.

What is claimed is:

1. The method of making silicon carbide-bearing material comprising the steps of:

introducing into a heat resistant vessel a relatively coarse particulate carbon-bearing material;

introducing a sufficient flow of non-reactive gas through a gas distribution member to bring the particulate carbon-bearing material into the state of fluidization;

applying an electric potential between electrodes positioned to be in direct contact with the fluidized carbon-bearing material particles to cause electric current to flow through the bed material between the electrodes in direct contact with the fluidized bed and at a rate sufficient to heat the said fluidized bed to a temperature in excess of the temperature of decomposition of silicon carbide;

introducing a finer particulate carbon-bearing material into the fluidized bed of coarser particulate carbon-bearing material;

controlling the relative size difference of the coarser and finer particulate carbon-bearing material and the velocity of the fluidizing gas to cause the finer particulate carbon-bearing material to be maintained in a state of dense phase fluidization in a region above the fluidized bed of the coarser particulate carbon-bearing material;

removing heat from the zone of the fluidized bed of the finer particulate carbon-bearing material sufficient to cause the temperature of the fluidized bed of the finer particulate carbon-bearing material to be lower than the temperature of the fluidized bed of the coarser particulate carbon-bearing material and below that of the decomposition temperature of silicon carbide, but above that temperature required to form silicon carbide by the reaction of vapor forms of silicon and solid carbon;

introducing a silicon-bearing material into the fluidized bed of coarser particulate carbon-bearing material to cause silicon vapors to form and to pass upwardly through the lower temperature fluidized bed of finer particulate carbon-bearing material and to react with the finer carbon-bearing material to form a silicon carbide-bearing material from the fluidized bed furnace.

2. The method of claim 1 wherein the silicon carbide-bearing material formed is beneficated by separation of carbon from the silicon carbide.

* * * * *